US011776140B2

(12) United States Patent
Singh et al.

(10) Patent No.: US 11,776,140 B2
(45) Date of Patent: Oct. 3, 2023

(54) COMPUTER VISION SYSTEMS AND METHODS FOR AUTOMATIC ALIGNMENT OF PARCELS WITH GEOTAGGED AERIAL IMAGERY

(71) Applicant: Insurance Services Office, Inc., Jersey City, NJ (US)

(72) Inventors: Aditya Singh, Uttarakhand (IN); Venkata Subbarao Veeravarasapu, Munich (DE); Aurobrata Ghosh, Munich (DE); Maneesh Kumar Singh, Lawrenceville, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 177 days.

(21) Appl. No.: 17/122,226

(22) Filed: Dec. 15, 2020

(65) Prior Publication Data

US 2021/0182529 A1 Jun. 17, 2021

Related U.S. Application Data

(60) Provisional application No. 62/948,509, filed on Dec. 16, 2019.

(51) Int. Cl.

| | |
|---|---|
| ***G06T 7/33*** | (2017.01) |
| ***G06T 7/30*** | (2017.01) |
| ***G06V 20/10*** | (2022.01) |

(52) U.S. Cl.

CPC .................. *G06T 7/33* (2017.01); *G06T 7/30* (2017.01); *G06V 20/176* (2022.01); *G06T 2207/10032* (2013.01); *G06T 2207/30181* (2013.01)

(58) Field of Classification Search

CPC . G06T 2207/10032; G06T 7/30; G06V 20/13; G06V 20/10

See application file for complete search history.

(56) References Cited

U.S. PATENT DOCUMENTS

2006/0041375 A1* 2/2006 Witmer .................. G01C 15/00 701/532
2006/0203337 A1* 9/2006 White .................. G09B 29/004 382/113

(Continued)

OTHER PUBLICATIONS

International Search Report of the International Searching Authority dated Mar. 19, 2021, issued in connection with International Application No. PCT/US20/65270 (3 pages).

(Continued)

*Primary Examiner* — Guillermo M Rivera-Martinez
(74) *Attorney, Agent, or Firm* — McCarter & English, LLP

(57) ABSTRACT

Computer vision systems and methods for automatic parcel alignment are provided. The system receives a geotagged aerial image, parcel information, and semantic information where each of the parcel and semantic information are overlaid on the geotagged aerial image. The system cleans the parcel information and the semantic information. The system optimizes the parcel information by grouping geo-registered parcels present in the geotagged aerial image into a plurality of islands and generating a plurality of parcel alignment solutions for each island of the plurality of islands. The system refines the plurality of parcel alignment solutions for each island and regularizes each island. The system generates a composite parcel alignment solution based on the refined plurality of parcel alignment solutions for each regularized island to align the geo-registered parcels of each regularized island with the geotagged aerial image.

20 Claims, 21 Drawing Sheets

(56) References Cited

U.S. PATENT DOCUMENTS

| | | | | |
|---|---|---|---|---|
| 2009/0073191 | A1 | 3/2009 | Smith et al. | |
| 2014/0219514 | A1 * | 8/2014 | Johnston ................ | G01C 11/06 382/113 |
| 2016/0232196 | A1 | 8/2016 | Nielsen et al. | |
| 2019/0213413 | A1 * | 7/2019 | Kottenstette ......... | G06V 20/176 |
| 2020/0167992 | A1 * | 5/2020 | Tran ................... | G01C 21/3852 |
| 2022/0215744 | A1 * | 7/2022 | Ton-That .............. | G06T 7/0002 |

OTHER PUBLICATIONS

Written Opinion of the International Searching Authority dated Mar. 19, 2021, issued in connection with International Application No. PCT/US20/65270 (6 pages).

* cited by examiner

FIG. 9B
160
162
Roofs over fences
Before
After

Rejected solutions

200

Refined solutions

210

230

COMPUTER VISION SYSTEMS AND METHODS FOR AUTOMATIC ALIGNMENT OF PARCELS WITH GEOTAGGED AERIAL IMAGERY

RELATED APPLICATIONS

This application claims priority to U.S. Provisional Patent Application Ser. No. 62/948,509 filed on Dec. 16, 2019, the entire disclosure of which is hereby expressly incorporated by reference.

BACKGROUND

Technical Field

The present disclosure relates generally to the field of computer vision. More specifically, the present disclosure relates to computer vision systems and methods for automatic alignment of parcels with geotagged aerial imagery.

Related Art

In the computer vision field, increasingly sophisticated software-based systems are being developed for automatically aligning geotagged aerial images with geo-registered county parcels (land property boundaries) present in such images. Such systems have wide applicability, including but not limited to, land surveying, real estate, banking (e.g., underwriting mortgage loans), insurance (e.g., title insurance and claims processing), and re-insurance.

There is currently significant interest in developing systems that automatically align geotagged aerial images with geo-registered county parcels present in the aerial images requiring no (or, minimal) user involvement, and with a high degree of accuracy. For example, it would be highly beneficial to develop systems that can automatically clean parcel and semantic input information obtained from the geotagged aerial images, optimize the information, refine the information and regularize the information such that the geo-registered county parcels present in the geotagged aerial images are properly aligned with the geotagged aerial images. Accordingly, the system of the present disclosure addresses these and other needs.

SUMMARY

The present disclosure relates to computer vision systems and methods for automatically aligning geo-registered parcels with geotagged aerial imagery, which require no (or, minimal) user involvement, and which operate with a high degree of accuracy. The system receives a geotagged aerial image, parcel information, and semantic information where each of the parcel information and the semantic information are overlaid on the geotagged aerial image. The geotagged aerial image can be a digital terrain model and can be identifiable by one of a postal address, latitude and longitude coordinates or Global Positioning System (GPS) coordinates. The parcel information delineates the geo-registered parcels present in the geotagged aerial image and the semantic information delineates and categorizes structures present within the geo-registered parcels present in the geotagged aerial image. The system cleans the parcel information and the semantic information by removing outlier parcel information and outlier semantic information overlaid on the geotagged aerial image. Additionally, the system optimizes the parcel information by grouping geo-registered parcels present in the geotagged aerial image into a plurality of islands and generating a plurality of parcel alignment solutions for each island of the plurality of islands. The system refines the plurality of parcel alignment solutions for each island by at least one of removing a parcel alignment solution that exceeds a predetermined margin of error or removing a parcel alignment solution that contradicts the semantic information. The system also regularizes each island. The system generates a composite parcel alignment solution based on the refined plurality of parcel alignment solutions for each regularized island to align the geo-registered parcels of each regularized island with the geotagged aerial image.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to a system and method for automatically aligning geotagged aerial images with geo-registered county parcels present in such images, as described in detail below in connection with FIGS. 1-13.

Figure 1:
FIG. 1 is a diagram illustrating a misaligned parcel and a parcel property boundary.

Turning to the drawings, FIG. 1 is a diagram illustrating a misaligned parcel 12 corresponding to a parcel property boundary 10. Parcel information often misaligns with parcel property boundaries in aerial images due to differences in the acquisition processes of the parcel information and the aerial images. Several factors including, but not limited to, the quantity of parcel information and aerial images, insufficient ground truth data, unknown physical models and erroneous (i.e., noisy) parcel and semantic input information complicate parcel alignment processing.

Large quantities of parcel information and aerial images requires laborious and time-consuming manual data cleaning. In addition, insufficient ground truth data complicates clarifying the delineation of a parcel when the parcel boundaries are obstructed or unclear. Ground truth data refers to data provided by direct observation. As such, ground truth data can clarify the delineation of a parcel when the parcel boundaries are obstructed by a tree and/or shadows or when the parcel boundaries are unclear because of a structure in addition to a home located on the parcel or in close proximity to the parcel boundaries. It is noted that a structure can be organic or inorganic and can include, but is not limited to, a lake, a pond, a tree, residential and commercial buildings, a flagpole, a water tower, a windmill, a street lamp, a power line, a greenhouse, a shed, a detached garage, a barn, a pool, a swing set, etc. Unknown physical models may also complicate parcel alignment processing. For example, during the acquisition processes of the parcel information and the aerial images, unique geometric shapes including, but not limited to, a torus; a octahedron, a hexaconal pyramid, a triangular prism, a cone, a cylinder, etc., of organic and non-organic structures present in the parcel information and the aerial images may not be recognized resulting in skewed parcel alignment. Challenges associated with noisy parcel and semantic input data are described in detail below in connection with FIGS. 2A-2B and 3A-3B.

Figure 2A:
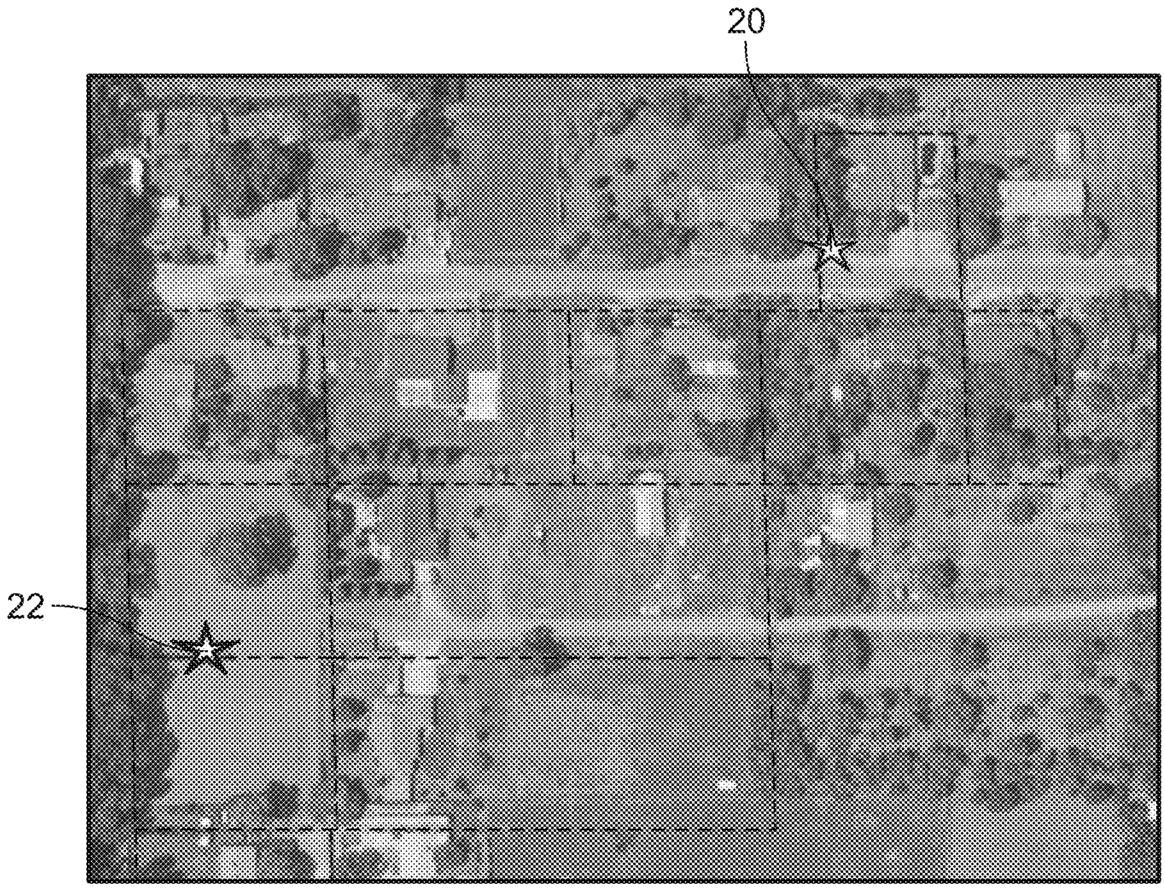
FIGS. 2A-2B are diagrams illustrating errors present in parcel input information.
Figure 2B:
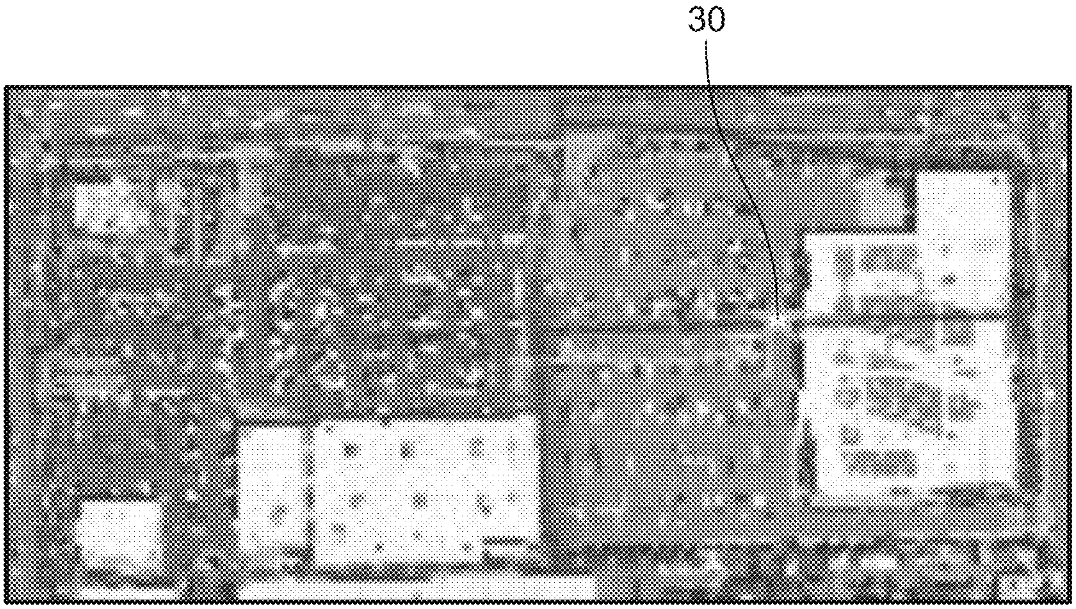

FIGS. 2A-2B are diagrams illustrating noisy parcel input information. Parcel input information refers to information that delineates parcel boundaries. Parcel input information can be noisy when errors are present in the parcel input information and/or the parcels are unconventional. For example, as shown in FIG. 2A, numeral 20 indicates an erroneous parcel that extends over a public road and numeral 22 indicates unconventional parcels that do not have structures (i.e., a roof structure is not detected). In addition, as shown in FIG. 2B, numeral 30 indicates an erroneous parcel wherein multiple parcels share a unitary roof structure.

Figure 3A:
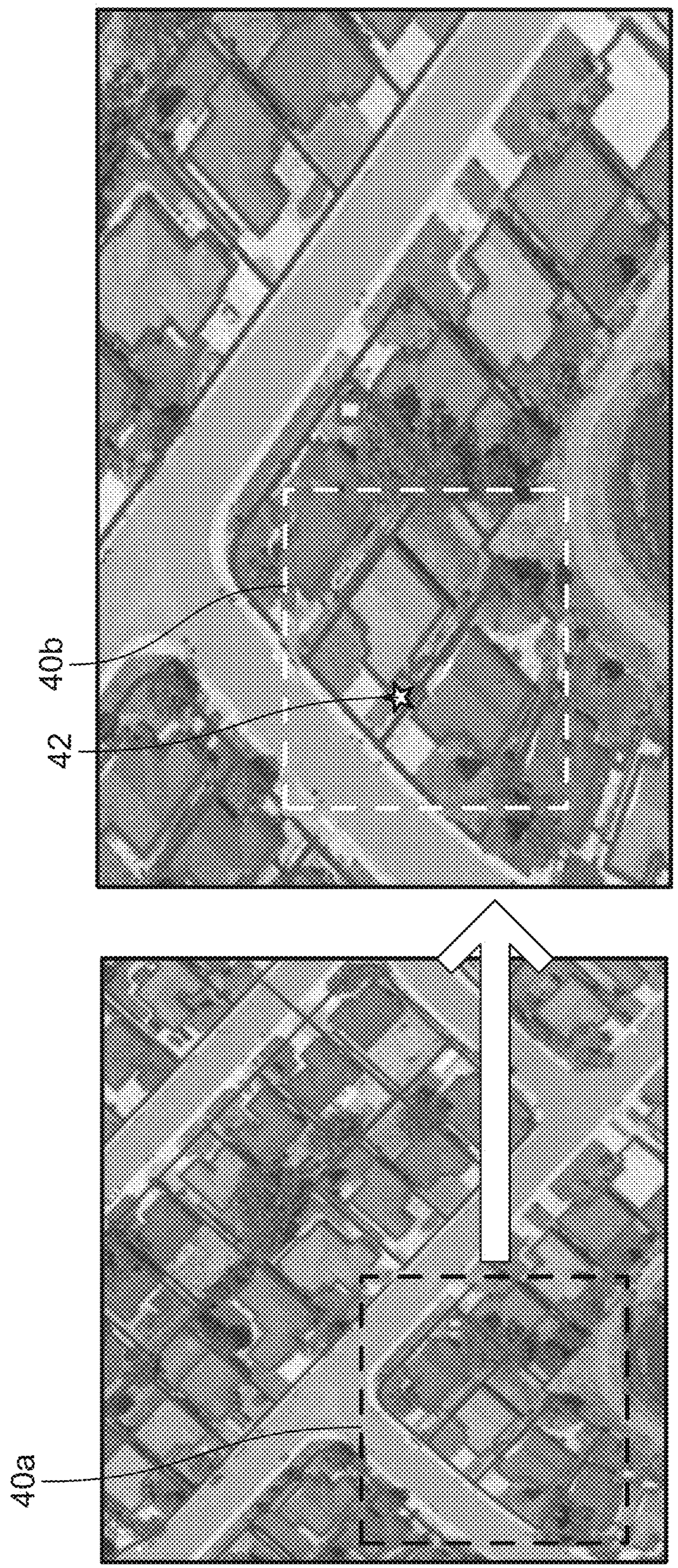
FIGS. 3A-3B are diagrams illustrating errors present in semantic input information.
Figure 3B:
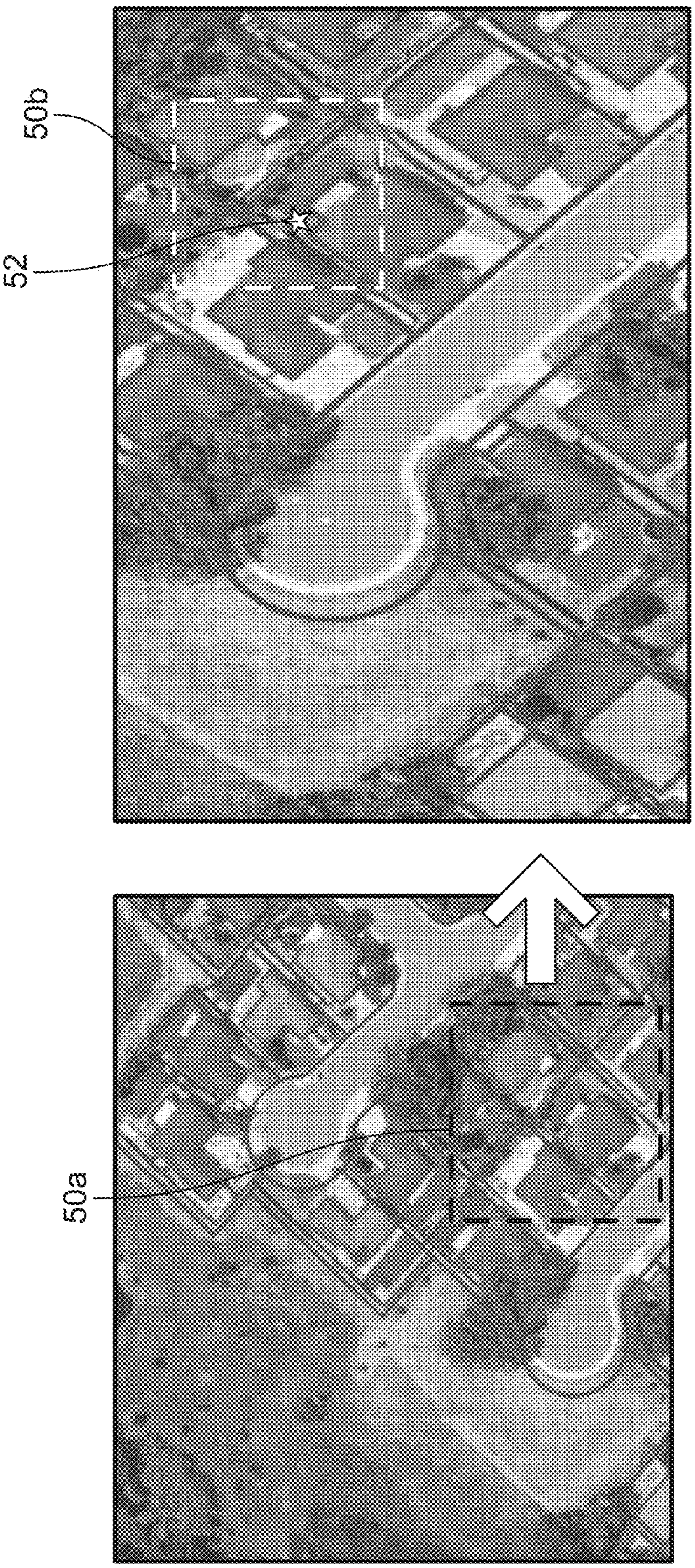

FIGS. 3A-3B are diagrams illustrating noisy semantic input information. Semantic input information refers to information labels that delineate and categorize structures and/or the features thereof present within parcel boundaries. Semantic input information can be noisy when errors are present in the semantic input information (e.g., the information labels erroneously delineate and/or categorize structures). For example, as shown in FIG. 3A, semantic input information window 40*b* illustrates a zoomed-in view of the semantic input information window 40*a* wherein numeral 42 indicates that two roof structures in adjacent parcels are erroneously fused (i.e., fused information labels). In addition, as shown in FIG. 3B, semantic input information window 50*b* illustrates a zoomed-in view of the semantic input information window 50*a* wherein numeral 52 indicates that a pool erroneously overlaps a roof structure (i.e., overlapping information labels).

Figure 4:
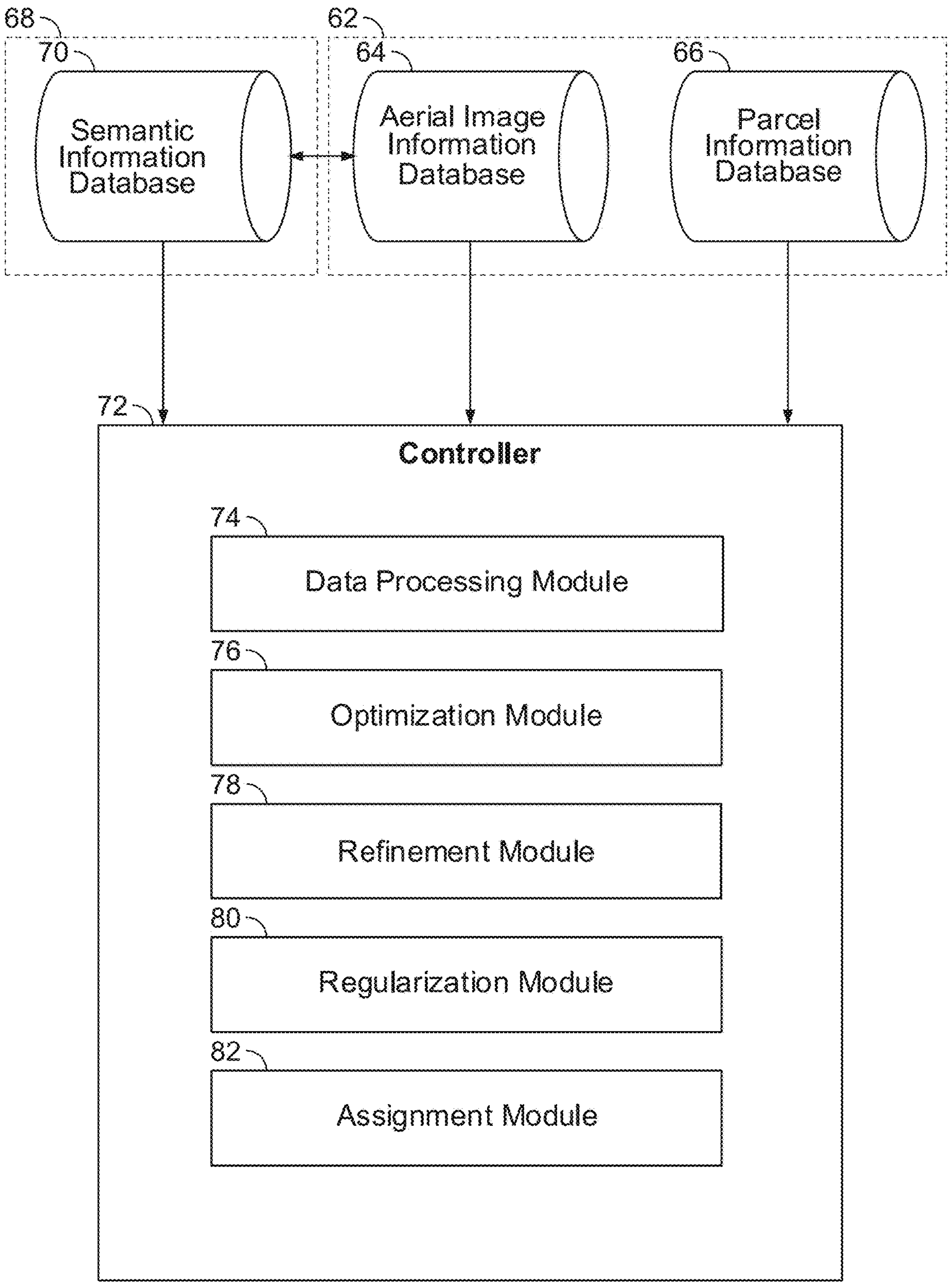
FIG. 4 is a diagram illustrating hardware and software components capable of being utilized to implement the system of the present disclosure.

FIG. 4 is a diagram illustrating hardware and software components capable of being utilized to implement the system of the present disclosure. The system could be embodied as a processing unit (e.g. a hardware processor) coupled to a primary input 62 including an aerial image information database 64 and a parcel information database 66 and a secondary input including a semantic information database 70. The aerial image information database 64 and the semantic information database 70 may exchange data with one another. The processor 72 is configured to automatically align geotagged aerial images with geo-registered county parcels present in the aerial images requiring no (or, minimal) user involvement, and with a high degree of accuracy. The processor 72 can include various modules that carry out the steps/processes discussed herein, and can include, but is not limited to, a data processing module 74, an optimization module 76, a refinement module 78, a regularization module 80 and an assignment module 82.

The processor could also include, but is not limited to, a personal computer, a laptop computer, a tablet computer, a smart telephone, a server, and/or a cloud-based computing platform. Further, code for carrying out the various steps/processes discussed herein could be distributed across multiple computer systems communicating with each other over a communications network, and/or stored and executed on a cloud computing platform and remotely accessed by a computer system in communication with the cloud platform. The code could communicate with the aerial image information database 64, the parcel information database 66 and the semantic information database 70 which could be stored on the same computer system as the code or on one or more other computer systems in communication with the code.

Figure 5:
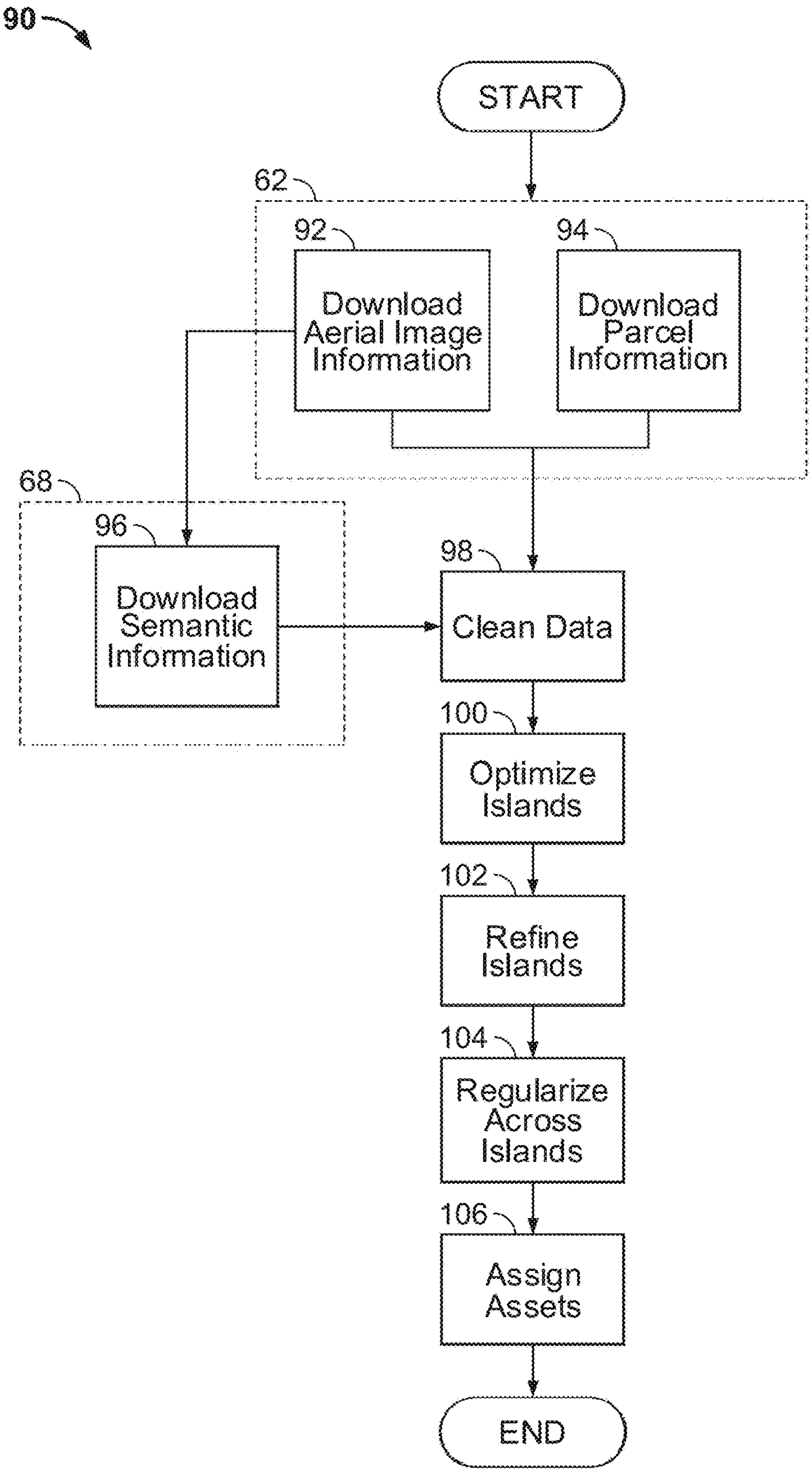
FIG. 5 is a flowchart illustrating processing steps carried out by the system of the present disclosure.

FIG. 5 is a flowchart illustrating processing steps 90 carried out by the system of FIG. 4. The system of the present disclosure allows for the automatic alignment of geotagged aerial images with geo-registered county parcels present in the aerial images requiring no (or, minimal) user involvement, and with a high degree of accuracy. The images can include aerial images taken from various angles including, but not limited to, plan views, nadir views, oblique views, etc. Beginning in step 92, the system obtains (e.g., receives or downloads) a geotagged aerial image. The aerial image could be a pre-existing digital terrain model (DTM) including, but not limited to, organic or inorganic structures such as a lake, a pond, a tree, residential and commercial buildings, a flagpole, a water tower, a windmill, a street lamp, a power line, a greenhouse, a shed, a detached garage, a barn, a pool, a swing set, etc. The aerial image can be identified by any suitable identifier, such as postal address, latitude and longitude coordinates, Global Positioning System (GPS) coordinates, or any other suitable identifier.

Then, in step 94, the system obtains (e.g., receives or downloads) parcel input information corresponding to the geotagged aerial image. As discussed above, parcel input information refers to information that delineates parcel boundaries present in the geotagged aerial image. In step 96, the system obtains (e.g., receives or downloads) semantic input information corresponding to the geotagged aerial image and parcel input information. Semantic input information refers to information labels that delineate and categorize structures and/or the features thereof present within parcel boundaries.

In step 98, the system cleans each of the parcel input information overlaid on the geotagged aerial image and the semantic input information overlaid on the geotagged aerial image. Then, in step 100, the system optimizes the parcel input information overlaid on the geotagged aerial image. Specifically, the system divides groups of parcels present in the aerial image into a series of islands and generates a plurality of parcel alignment solutions for each island. In step 102, the system refines the generated plurality of parcel alignment solutions for each island. For example, the system narrows the generated plurality of parcel alignment solutions for each island by rejecting parcel alignment solutions that exceed a predetermined margin of error and/or do not comply with the information labels that delineate and categorize structures and/or the features thereof present within parcel boundaries (e.g., a parcel boundary overlaying a roof structure).

In step 104, the system regularizes the islands by assigning each island a numerical value in ascending order along a shortest path connecting the islands to one another. Regularization allows for evaluating an accuracy of the refined plurality of parcel alignment solutions for each island. Lastly, in step 106, the system assigns the structures (i.e., assets) and/or features thereof present in the semantic input information to parcels present in a composite parcel alignment solution. The composite parcel alignment solution comprises the most accurate parcel alignment solution for each island from among the refined plurality of parcel alignment solutions for each island. As such, the composite parcel alignment solution comprises respective island parcel alignment solutions wherein each parcel alignment solution provides an assignment of assets contained therein.

Figure 6A:
FIGS. 6A-6B are diagrams illustrating an aerial image and parcel input information overlaid on the aerial image.
Figure 6B:
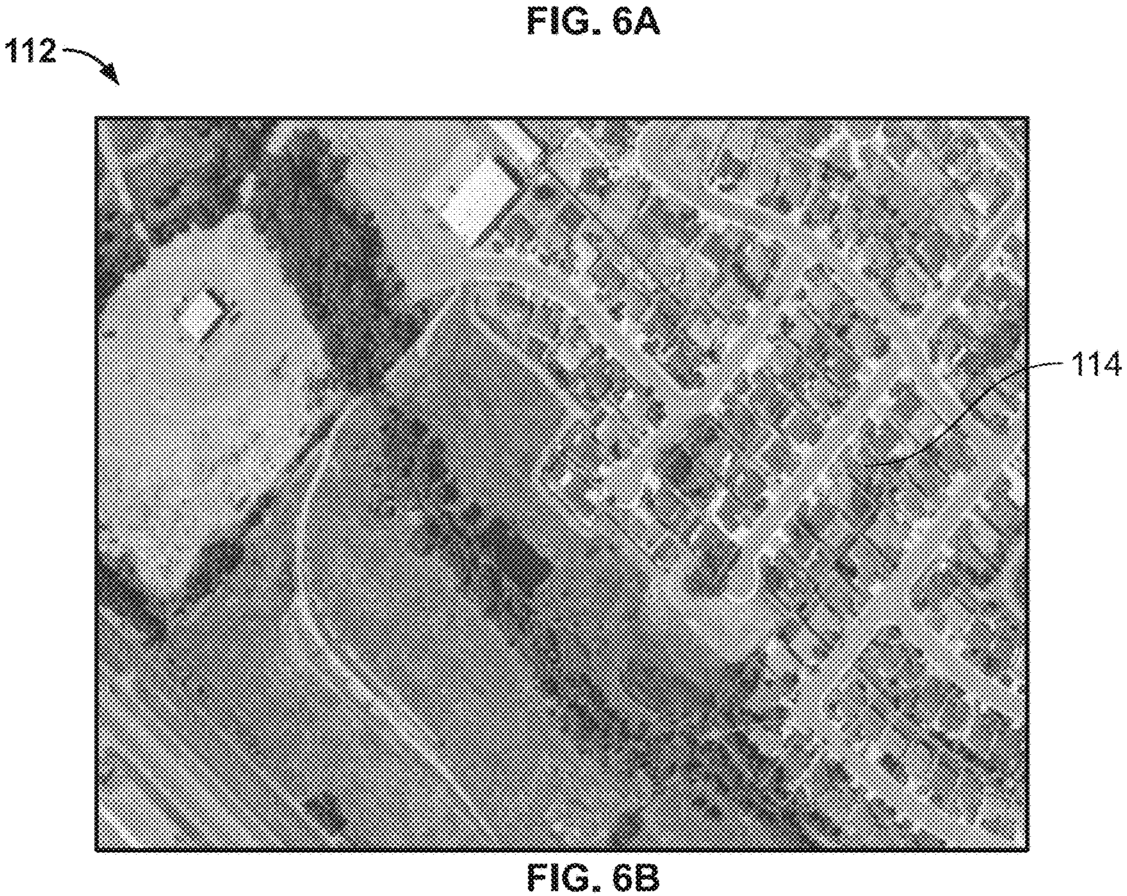
Figure 7:
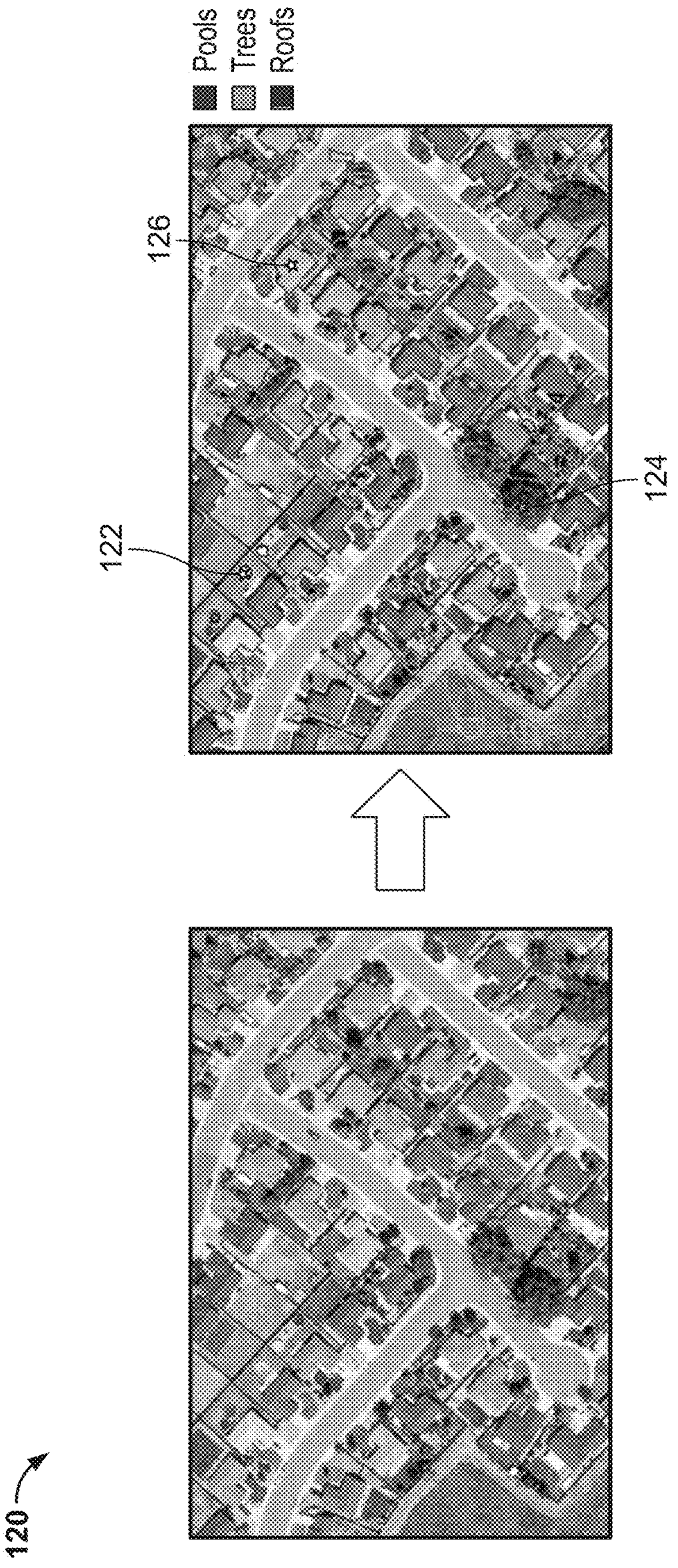
FIG. 7 is a diagram illustrating an aerial image and semantic input information overlaid on the aerial image.

FIG. 6A is a diagram 110 illustrating a sample aerial image, and FIG. 6B is a diagram 112 illustrating parcel input information overlaid on the exemplary aerial image wherein the parcel input information denotes a plurality of parcels 114. FIG. 7 is a diagram 120 illustrating a sample aerial image and semantic input information overlaid on the aerial image wherein the semantic input information denotes a plurality of pools 122, trees 124 and roof structures 126 corresponding to residential buildings.

Figure 8A:
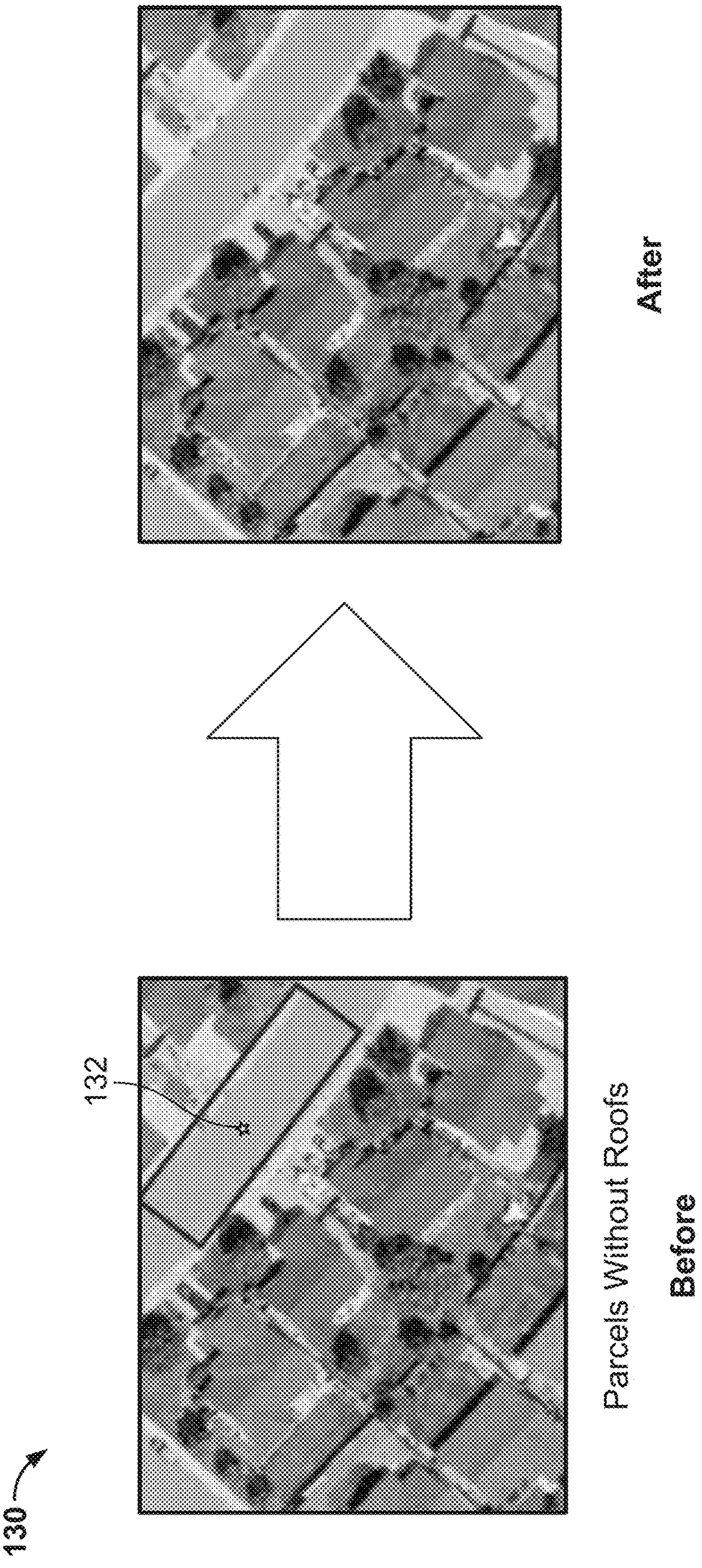
FIGS. 8A-8B are diagrams illustrating step 98 of FIG. 5 carried out on parcel input information.
Figure 8B:
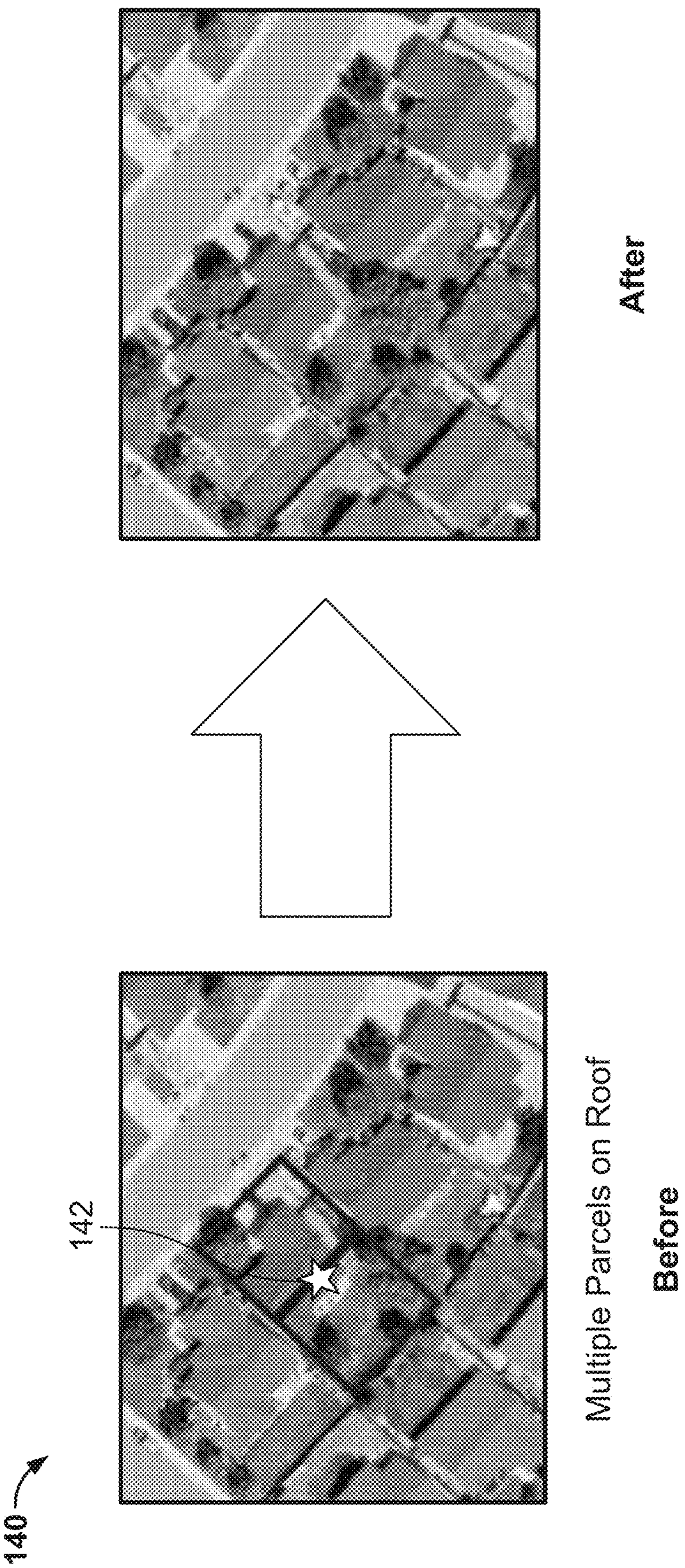

FIGS. 8A and 8B, respectively, show diagrams 130 and 140 illustrating parcel input information overlaid on an aerial image before and after step 98 of FIG. 5 is carried out on the parcel input information by the system of the present disclosure. As shown in FIGS. 8A-8B, the system can remove errors present in the parcel input information. For example, in FIG. 8A the system removes a parcel 132 that does not contain a structure (e.g., a parcel located on a street). In another example, and as shown in FIG. 8B, the system removes multiple parcels 142 corresponding to a single structure.

Figure 9A:
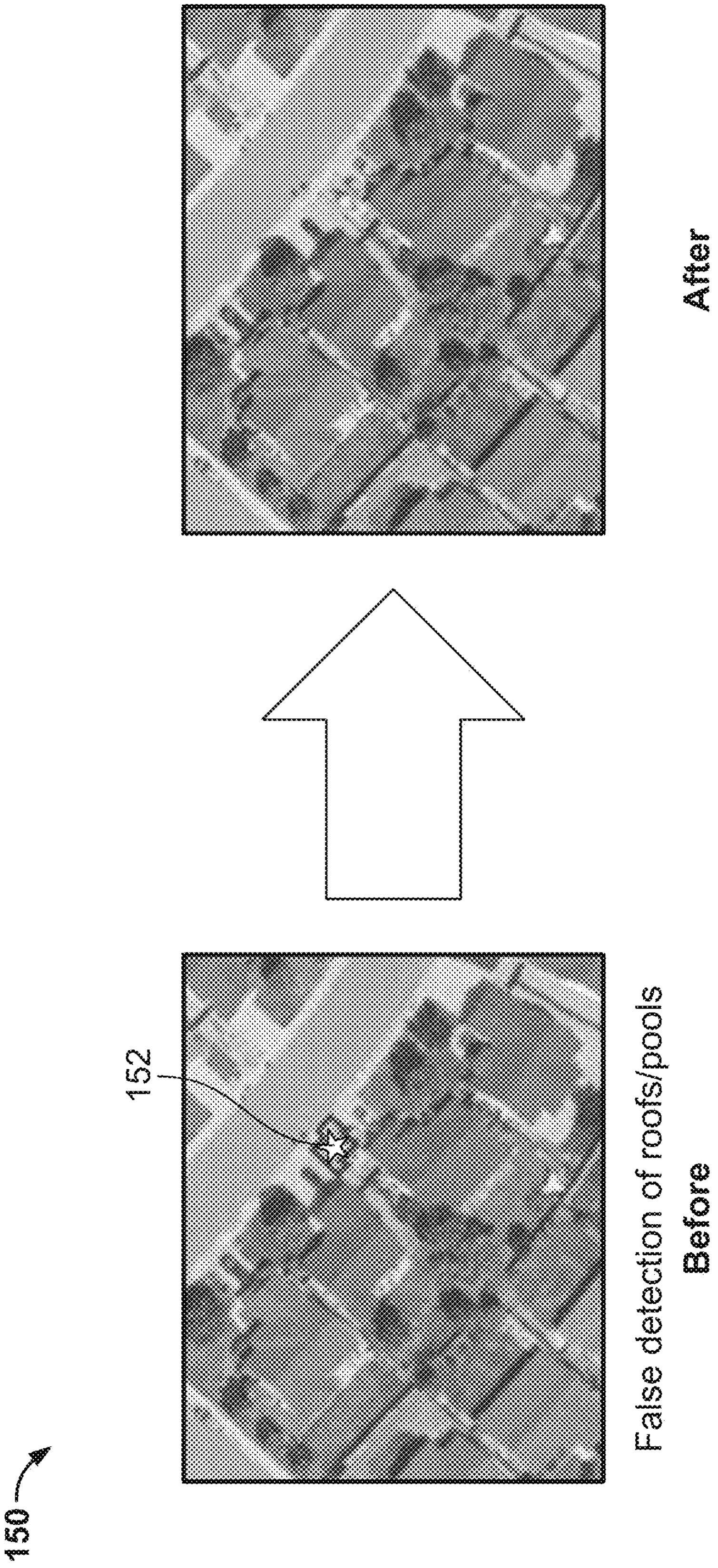
FIGS. 9A-9C are diagrams illustrating step 98 of FIG. 5 carried out on semantic input information.
Figure 9B:
Figure 9C:
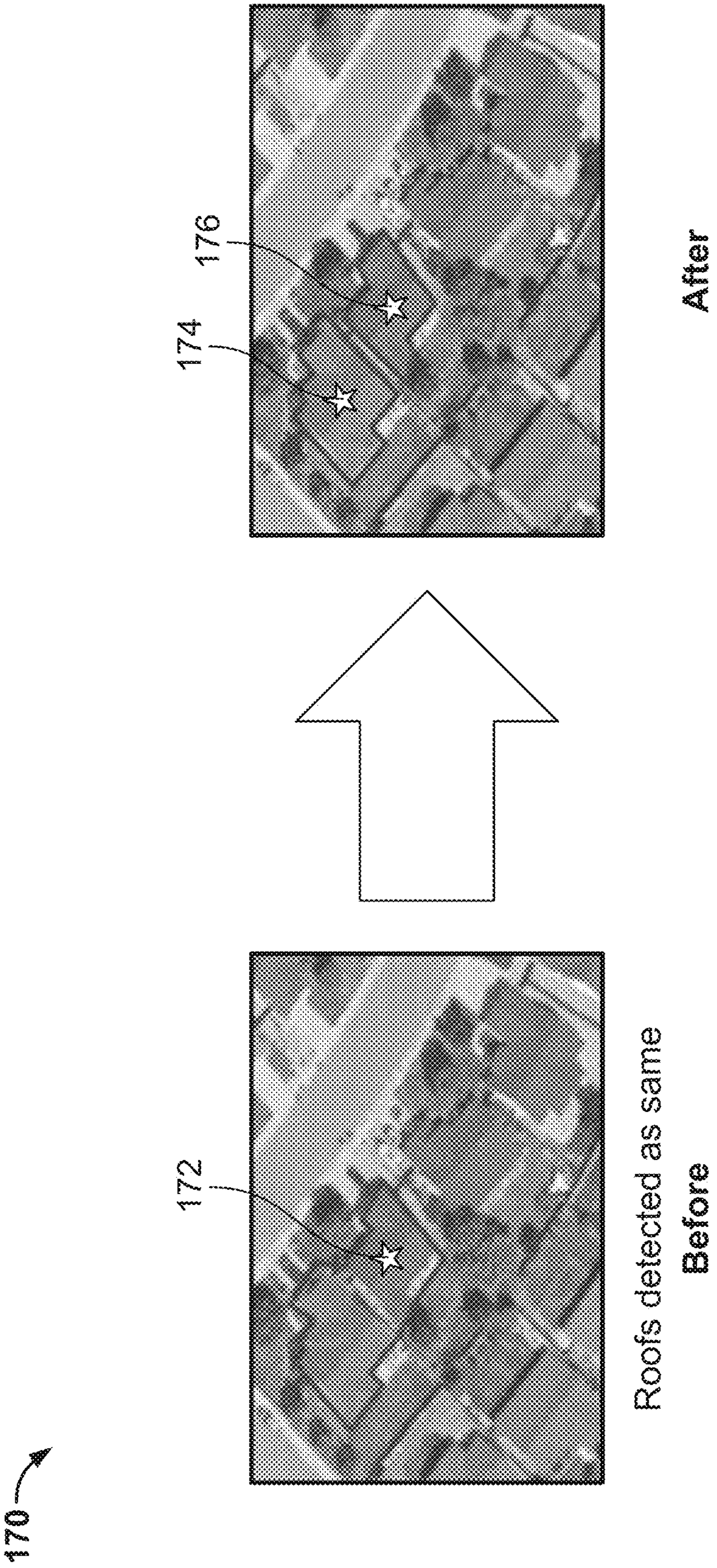

FIGS. 9A-9C, respectively, show diagrams 150, 160 and 170 illustrating semantic input information overlaid on an aerial image before and after the step 98 of FIG. 5 is carried out on the semantic input information. As shown in FIGS. 9A-9C, the system can remove errors present in the semantic input information. For example, in FIG. 9A, the system can remove a falsely detected structure 152 including, but not limited to, a roof structure or pool. In another example, in FIG. 9B, the system can adjust the boundaries of a roof structure 162 erroneously encompassing a fence. Additionally, in FIG. 9C, the system can correct the boundaries of a roof structure 172 erroneously encompassing two separate roof structures 174 and 176.

Figure 10:
FIG. 10 is a diagram illustrating step 100 of FIG. 5 carried out by the system of the present disclosure.

FIG. 10 is a diagram 180 illustrating step 100 of FIG. 5 carried out by the system of the present disclosure. As shown in FIG. 10, the system optimizes the downloaded parcel input information overlaid on the downloaded geotagged aerial image. Specifically, the system divides groups of parcels present in the aerial image into a series of islands I (e.g., computational units) and generates a plurality of parcel alignment solutions 182, 184 and 186 for each island I. The processor can implement 30 parcel alignment solutions for each island I. The processor may also implement solutions on aerial images in parallel. The system can develop an optimization-based method that selects a parcel alignment solution whose boundaries better align with edges computed from an image. This can be done by minimizing an objective function (cost function) that measure the deviation between parcel boundaries and image gradients. In such circumstances, the objective can be referred to as the edge alignment cost. Additionally, the optimization processes discussed herein can result in a plurality of solutions, some of which are penalized if their parcel boundaries are not consistent with semantic assets such as buildings, pools, etc. The penalty term can be referred to as a semantic asset violation term.

Figure 11A:
FIGS. 11A-11B are diagrams illustrating step 102 of FIG. 5 carried out by the system of the present disclosure.
Figure 11B:

FIGS. 11A-11B, respectively, show diagrams 190 and 200 illustrating step 102 of FIG. 5 carried out by the system of the present disclosure. As shown in FIG. 11A, during the refinement step 102, the system narrows the generated plurality of parcel alignment solutions for each island by rejecting parcel alignment solutions 192, 194 and 196 that exceed a predetermined margin of error and/or do not comply with the information labels that delineate and categorize structures and/or the features thereof present within parcel boundaries (e.g., a parcel boundary overlaying a street). As such and as shown in FIG. 11B, the system refines the generated plurality of parcel alignment solutions for each island I by narrowing the generated plurality of parcel alignment solutions for each island I to parcel alignment solutions that more accurately delineate the parcels of each island I.

Figure 12A:
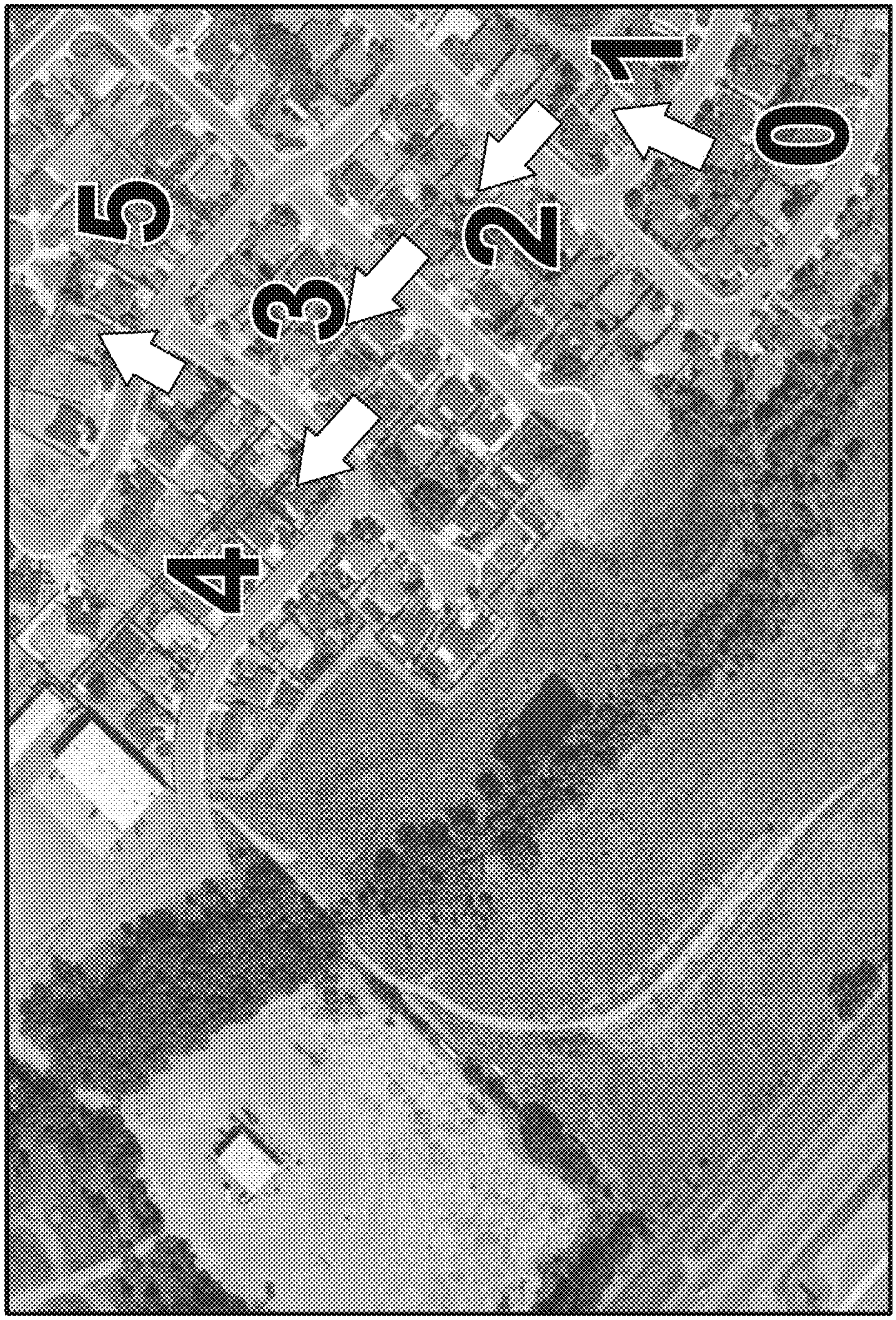
FIGS. 12A-12C are diagrams illustrating step 104 of FIG. 5 carried out by the system of the present disclosure.
Figure 12B:
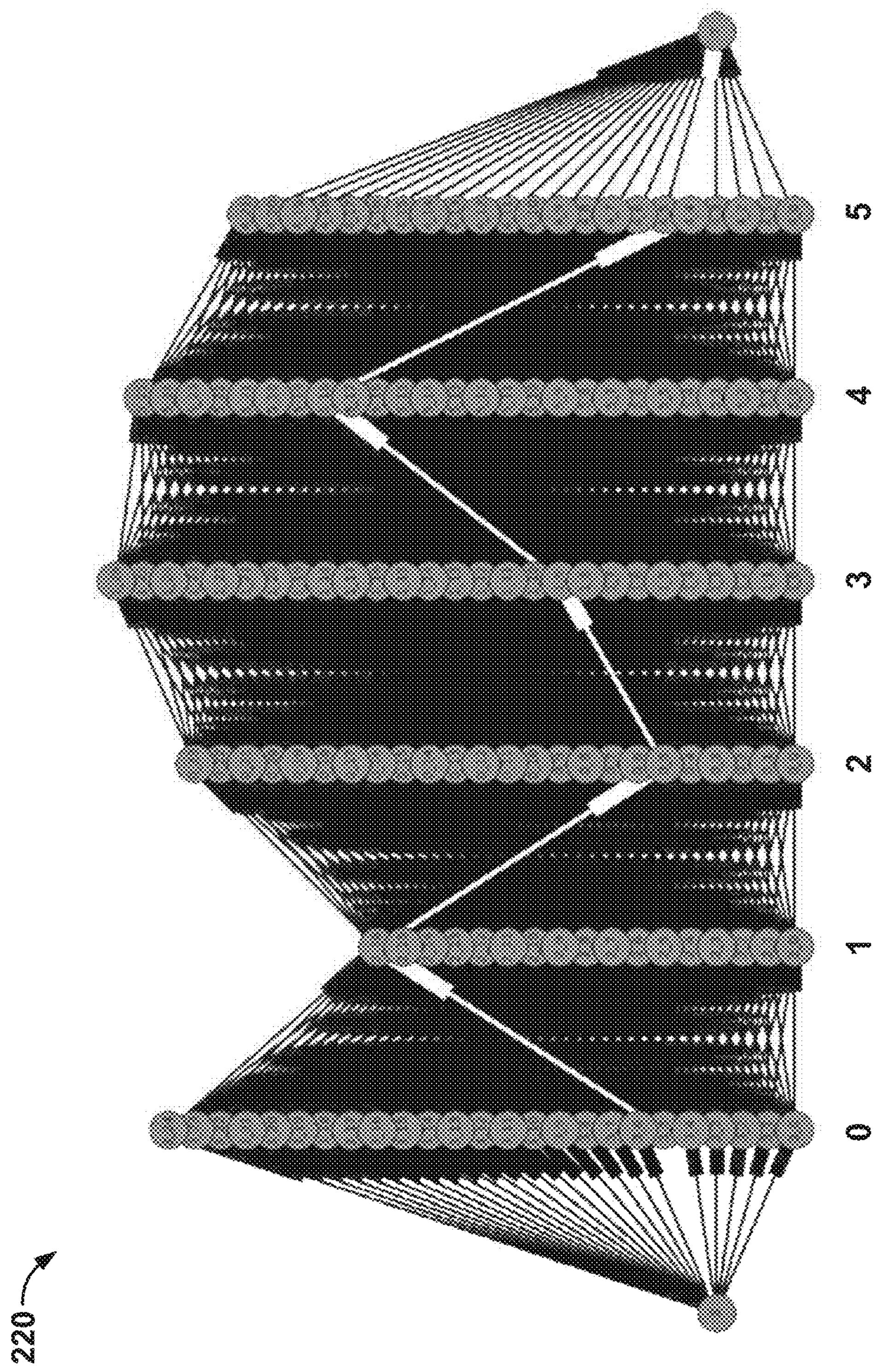
Figure 12C:

FIGS. 12A-12C are diagrams 210, 220, and 230 illustrating step 104 of FIG. 5 carried out by the system of the present disclosure. As shown in FIG. 12A, the system regularizes the islands I by assigning each island I a numerical value in ascending order along a shortest path connecting the islands I to one another. FIG. 12B illustrates an algorithm for determining the shortest path among a plurality of paths connecting the islands I to one another and assigning each island I a numerical value in ascending order along the determined shortest path connecting the islands I to one another. FIG. 12C illustrates a ranking of parcel alignment solutions for a plurality of paths connecting the islands I to one another according to a gradient. Regularization allows for evaluating an accuracy of the refined plurality of parcel alignment solutions for each island I.

Figure 13:
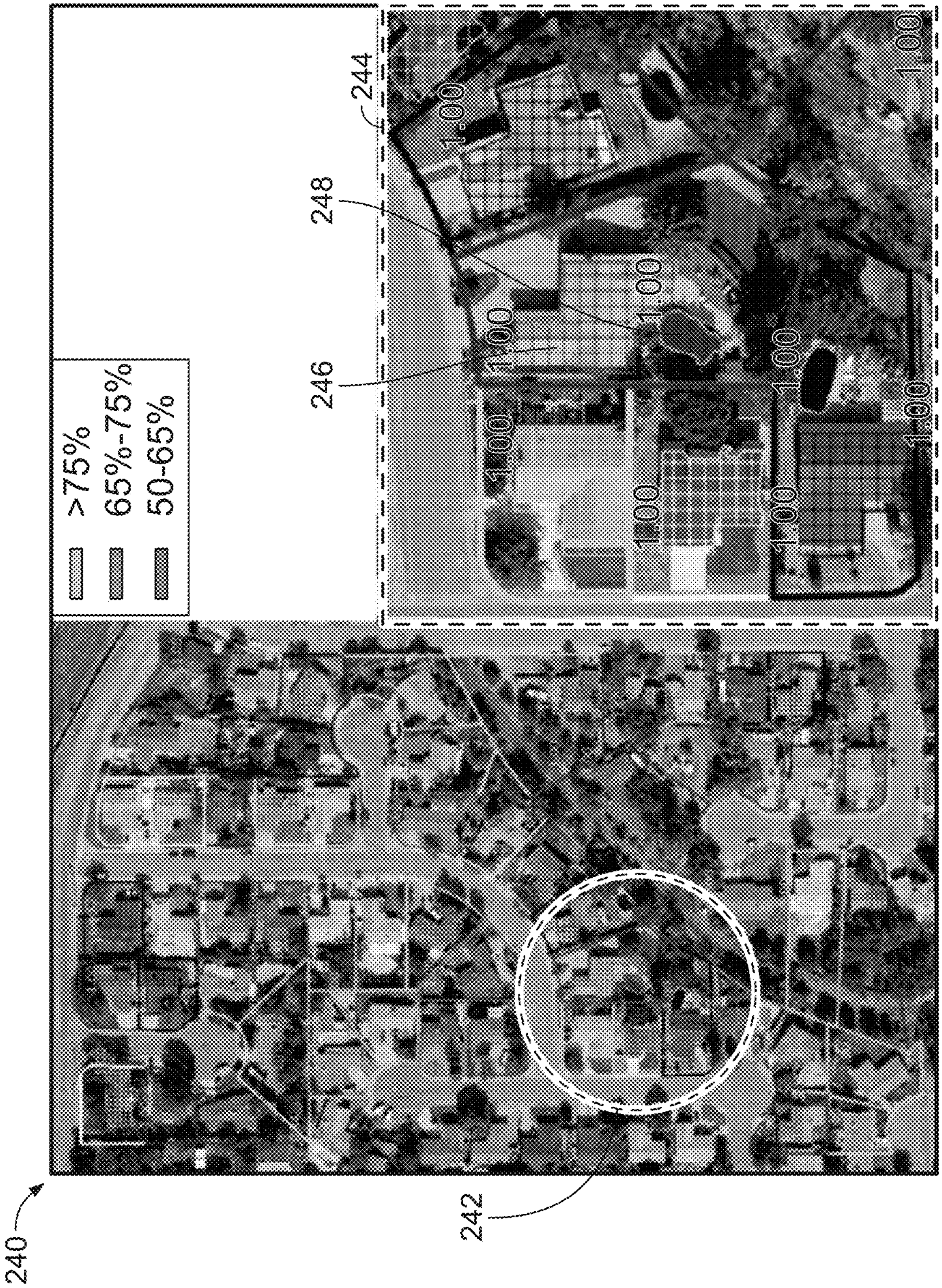
FIG. 13 is a diagram illustrating step 106 of FIG. 6 carried out by the system of the present disclosure.

FIG. 13 is a diagram 240 illustrating step 106 of FIG. 5 carried out by the system of the present disclosure. As shown in FIG. 13, the system assigns structures (i.e., assets) and/or features thereof present in the downloaded semantic input information to parcels present in the composite parcel alignment solution. The composite parcel alignment solution comprises the most accurate parcel alignment solution for each island from among the refined plurality of parcel alignment solutions for each island. As such, the composite parcel alignment solution comprises respective island parcel alignment solutions wherein each parcel alignment solution provides an assignment of assets contained therein. For example, window 244 denotes a zoomed-in view of window 242, wherein roof structures 246 and pools 248 are assigned to parcels present in the composite parcel alignment solution. As such, each composite parcel alignment solution includes multiple parcel alignment solutions wherein each parcel alignment solution provides an assignment of assets contained therein.

Having thus described the present disclosure in detail, it is to be understood that the foregoing description is not intended to limit the spirit or scope thereof. What is desired to be protected by Letters Patent is set forth in the following claims.

What is claimed is:

1. A computer vision system for automatic parcel alignment comprising:

a memory; and a processor in communication with the memory, the processor:

receiving a geotagged aerial image, parcel information, and semantic information from the memory;

cleaning the parcel information and the semantic information;

optimizing the parcel information by:

grouping geo-registered parcels present in the geotagged aerial image into a plurality of islands, each of the geo-registered parcels including at least one land boundary property and each of the plurality of islands comprising a computational unit generated by dividing the geo-registered parcels present in the geotagged aerial image, and generating a plurality of parcel alignment solutions for each island of the plurality of islands, wherein each of the plurality of parcel alignment solutions is based on an automatic alignment of the geotagged aerial image with geo-registered parcels present in the aerial image;

refining the plurality of parcel alignment solutions for each island of the plurality of islands;

regularizing each island of the plurality of islands; and generating a composite parcel alignment solution based on the refined plurality of parcel alignment solutions for each regularized island to align the geo-registered parcels of each regularized island with the geotagged aerial image.

2. The system of claim 1, wherein the geotagged aerial image is a digital terrain model and is identifiable by one of a postal address, latitude and longitude coordinates or Global Positioning System (GPS) coordinates.

3. The system of claim 1, wherein:

the parcel information delineates the geo-registered parcels present in the geotagged aerial image and is overlaid on the geotagged aerial image, and the semantic information delineates and categorizes structures present within the geo-registered parcels present in the geotagged aerial image and is overlaid on the geotagged aerial image.

4. The system of claim 1, wherein the processor cleans the parcel information and the semantic information by removing outlier parcel information and outlier semantic information overlaid on the geotagged aerial image.

5. The system of claim 1, wherein the processor refines the plurality of parcel alignment solutions for each island of the plurality of islands by at least one of removing a parcel alignment solution that exceeds a predetermined margin of error or removing a parcel alignment solution that contradicts the semantic information.

6. The system of claim 1, wherein the processor regularizes each island of the plurality of islands by:

determining a shortest path among a plurality of paths connecting the plurality of islands to one another, assigning each island a numerical value in ascending order along the shortest path connecting the plurality of islands, and ranking the refined plurality of parcel alignment solutions for the plurality of paths connecting the plurality of islands to one another according to a gradient to determine an accuracy of each of the refined plurality of parcel alignment solutions for each island.

7. The system of claim 1, wherein the processor assigns the cleaned semantic information to the plurality of geo-registered parcels of each island of the composite parcel alignment solution.

8. The system of claim 1, wherein the composite parcel alignment solution includes a parcel alignment solution having a greatest accuracy for each regularized island from among the refined plurality of parcel alignment solutions for each regularized island.

9. A method for automatic parcel alignment by a computer vision system, comprising the steps of:

receiving by a processor a geotagged aerial image, parcel information, and semantic information;

cleaning the parcel information and the semantic information;

optimizing the parcel information by:

grouping geo-registered parcels present in the geotagged aerial image into a plurality of islands, each of the geo-registered parcels including at least one land boundary property and each of the plurality of islands comprising a computational unit generated by dividing the geo-registered parcels present in the geotagged aerial image, and generating a plurality of parcel alignment solutions for each island of the plurality of islands, wherein each of the plurality of parcel alignment solutions is based on an automatic alignment of the geotagged aerial image with geo-registered parcels present in the aerial image;

refining the plurality of parcel alignment solutions for each island of the plurality of islands;

regularizing each island of the plurality of islands; and generating a composite parcel alignment solution based on the refined plurality of parcel alignment solutions for each regularized island to align the geo-registered parcels of each regularized island with the geotagged aerial image.

10. The method of claim 9, wherein the geotagged aerial image is a digital terrain model and is identifiable by one of a postal address, latitude and longitude coordinates or Global Positioning System (GPS) coordinates.

11. The method of claim 9, wherein:

the parcel information delineates the geo-registered parcels present in the geotagged aerial image and is overlaid on the geotagged aerial image, and the semantic information delineates and categorizes structures present within the geo-registered parcels present in the geotagged aerial image and is overlaid on the geotagged aerial image.

12. The method of claim 9, further comprising the step of cleaning the parcel information and the semantic information by removing outlier parcel information and outlier semantic information overlaid on the geotagged aerial image.

13. The method of claim 9, further comprising the steps of refining the plurality of parcel alignment solutions for each island of the plurality of islands by at least one of removing a parcel alignment solution that exceeds a predetermined margin of error or removing a parcel alignment solution that contradicts the semantic information.

14. The method of claim 9, further comprising the steps of regularizing each island of the plurality of islands by:

determining a shortest path among a plurality of paths connecting the plurality of islands to one another, assigning each island a numerical value in ascending order along the shortest path connecting the plurality of islands, and ranking the refined plurality of parcel alignment solutions for the plurality of paths connecting the plurality of islands to one another according to a gradient to determine an accuracy of each of the refined plurality of parcel alignment solutions for each island.

15. The method of claim 9, further comprising the step of assigning the cleaned semantic information to the plurality of geo-registered parcels of each island of the composite parcel alignment solution.

16. The method of claim 9, wherein the composite parcel alignment solution includes a parcel alignment solution having a greatest accuracy for each regularized island from among the refined plurality of parcel alignment solutions for each regularized island.

17. A non-transitory computer readable medium having instructions stored thereon for automatic parcel alignment by a computer vision system which, when executed by a processor, causes the processor to carry out the steps of:

receiving by a processor a geotagged aerial image, parcel information, and semantic information;

cleaning the parcel information and the semantic information;

optimizing the parcel information by:

grouping geo-registered parcels present in the geotagged aerial image into a plurality of islands, each of the geo-registered parcels including at least one land boundary property and each of the plurality of islands comprising a computational unit generated by dividing the geo-registered parcels present in the geotagged aerial image, and generating a plurality of parcel alignment solutions for each island of the plurality of islands, wherein each of the plurality of parcel alignment solutions is based on an automatic alignment of the geotagged aerial image with geo-registered parcels present in the aerial image;

refining the plurality of parcel alignment solutions for each island of the plurality of islands;

regularizing each island of the plurality of islands; and generating a composite parcel alignment solution based on the refined plurality of parcel alignment solutions for each regularized island to align the geo-registered parcels of each regularized island with the geotagged aerial image.

18. The non-transitory computer readable medium of claim 17, the processor further carrying out the step of regularizing each island of the plurality of islands by:

determining a shortest path among a plurality of paths connecting the plurality of islands to one another, assigning each island a numerical value in ascending order along the shortest path connecting the plurality of islands, and ranking the refined plurality of parcel alignment solutions for the plurality of paths connecting the plurality of islands to one another according to a gradient to determine an accuracy of each of the refined plurality of parcel alignment solutions for each island.

19. The non-transitory computer readable medium of claim 17, the processor further carrying out the step of assigning the cleaned semantic information to the plurality of geo-registered parcels of each island of the composite parcel alignment solution.

20. The non-transitory computer readable medium of claim 17, wherein the composite parcel alignment solution includes a parcel alignment solution having a greatest accuracy for each regularized island from among the refined plurality of parcel alignment solutions for each island.

* * * * *

UNITED STATES PATENT AND TRADEMARK OFFICE

CERTIFICATE OF CORRECTION

PATENT NO. : 11,776,140 B2
APPLICATION NO. : 17/122226
DATED : October 3, 2023
INVENTOR(S) : Singh et al.

It is certified that error appears in the above-identified patent and that said Letters Patent is hereby corrected as shown below:

On the Title Page

Item (72) under the Inventors, Aurobrata Ghosh's residential information, namely, "Munich (DE)," should be deleted and replaced with "Pondicherry (IN)"

Item (72) under the Inventors, Maneesh Kumar Singh's residential information, namely, "Lawrenceville, NJ (US)," should be deleted and replaced with "Princeton, NJ (US)"

Signed and Sealed this
Twenty-sixth Day of March, 2024

Katherine Kelly Vidal

Katherine Kelly Vidal
*Director of the United States Patent and Trademark Office*